United States Patent [19]

Pole et al.

[11] Patent Number: 4,705,816

[45] Date of Patent: Nov. 10, 1987

[54] LIQUID MULCH

[75] Inventors: Ernest G. Pole; David Carnell, both of Sarnia, Canada

[73] Assignee: Polysar Limited, Sarnia, Canada

[21] Appl. No.: 854,726

[22] Filed: Apr. 16, 1986

Related U.S. Application Data

[63] Continuation of Ser. No. 652,528, Sep. 20, 1984, abandoned.

[51] Int. Cl.⁴ .................... C09K 17/00; C09K 17/02
[52] U.S. Cl. .................................... 523/132; 524/17; 524/37; 524/47; 524/72; 524/426; 524/445; 524/449
[58] Field of Search .................. 523/123, 131, 132; 524/17, 37, 47, 72, 425, 426, 449, 424, 445

[56] References Cited

U.S. PATENT DOCUMENTS

| | | | |
|---|---|---|---|
| 2,816,083 | 12/1957 | Shearer, Jr. .................. | 523/132 |
| 2,868,758 | 1/1959 | Baker .......................... | 523/132 |
| 2,961,799 | 11/1960 | Coe ............................. | 47/9 |
| 3,121,973 | 2/1964 | Phillips et al. .............. | 111/7 |
| 4,156,666 | 5/1979 | Odate et al. ................. | 524/424 |
| 4,208,973 | 6/1980 | Baer et al. ................... | 47/9 |
| 4,312,914 | 1/1982 | Guth ............................ | 427/386 |
| 4,344,979 | 8/1982 | Gago et al. .................. | 427/4 |
| 4,402,725 | 9/1983 | Heller et al. ................ | 71/27 |
| 4,465,017 | 8/1984 | Simmons ..................... | 427/242 |

FOREIGN PATENT DOCUMENTS 876069 7/1971 Canada .
1007671 10/1965 United Kingdom .

*Primary Examiner*—John Kight
*Assistant Examiner*—Nathan M. Nutter
*Attorney, Agent, or Firm*—Stevens, Davis, Miller & Mosher

[57] ABSTRACT

The disadvantages associated with using plastic sheet mulch may be overcome and enhanced crop production obtained by applying to an agricultural domain an aqueous compound capable of forming a durable crust under the condition of use comprising per 100 parts by weight of polymeric binder from about 100 to about 1,600 parts by weight of a fine particulate filler to provide a dry coat weight from 0.1 to 5.0 ounces per square foot.

4 Claims, No Drawings

LIQUID MULCH

This application is a continuation of application Ser. No. 652,528 filed Sept. 20, 1984 now abandoned.

BACKGROUND OF THE INVENTION

The present invention relates to a method for enhancing crop production. Crop production may be enhanced in up to four ways in accordance with the present invention. The present invention seeks to enhance crop production by providing at least one of, increased plant population, increased yield, a reduced time to plant maturity, and an increased survival rate through decreased stress on plants. Any method of increasing crop production is valuable to the agricultural, horticultural or reforestation industries. A method of decreasing the time to crop maturation is of significant interest to fresh produce farmers as it provides earlier crops which may often be sold at a premium price. It also permits staggering the receipt of harvested crops over a longer period of time. The staggering of crops permits food processing plants to have a more uniform production. In areas where successive crops are grown during the year, decreasing the period of time to harvest may permit the planting of an additional crop further increasing the total production from the land under cultivation. In horticultural industries this results in a shorter time for trays of plants to be ready for marketing. This will increase green house yields for decorative plants, potted plants and vegetables for transplanting.

In the production of vegetables, there has been an increasing trend to use plastic film mulch. This mulch helps keep weeds down, reduces the leaching of minerals from the soil, retains moisture, warms the soil and in some cases helps retain volatile fumigants applied to the soil prior to planting. Some plastic mulches are promoted as photodegradable. This usually involves incorporating a photo-degradable component in the plastic. It is difficult to compound the plastic so that the mulch maintains its integrity substantially throughout the growing season and then rapidly degrades as the crop ripens. It is also extremely difficult to estimate the weathering conditions the mulch will be exposed to in any given year. Most plastic mulches have to be removed from the fields prior to preparing for the next crop. This is a labour and energy intensive job. The removal cost is relatively high, about $125-150. per acre. If the plastic mulch is not removed it may cause problems in further use of the field.

In applying a plastic mulch it is not possible to change application weights and widths "on the fly" and the edge of the mulch must be buried in the soil to hold the mulch in place. The plastic mulch system requires special equipment, is relatively inflexible and permits only about 75% of the plastic being effectively used, and must be laid tight to prevent flapping in the wind.

The present liquid mulch system seeks to overcome these drawbacks as the compositions of the present invention are easily applied to an agricultural domain. The compounds of the present invention may be applied by spraying so that they are applied only as required and the coat weight may be readily adjusted and may be applied simultaneously with seeding or transplanting. The compositions of the present invention form a friable crust which is readily broken by mechanical action. Thus, the field only need to be ploughed and/or harrowed in preparation for the next planting. Generally, the friable crust provided by the present invention has sufficient integrity to help reduce evaporation yet it has sufficient porosity to permit water or post applied fertilizer top dressing, particularly nitrogen, to enter the soil, especially during the later stages of plant development. The present invention permits the incorporation of a broader range of herbicides, insecticides, fungicides, and nematicides than those which may be incorporated into plastic mulch as such agents must be capable of withstanding extrusion temperatures of about 250° C.

As an added benefit, the present invention helps reduce soil erosion and the leaching of fertilizer due to wind and water. This helps reduce losses of young plants in heavy rains or high winds.

U.S. Pat. 2,961,799, issued Nov. 29, 1960, to Alco Oil and Chemical Corporation discloses a method for treating soil to prevent erosion. The method involves applying to the soil a composition comprising about 0.5 to 5, preferably about 2 to 4, weight per cent of a water insoluble rubber and 0.005 to 0.5, preferably about 0.05 to 0.15 weight per cent of a counter penetrant at a rate to provide about 0.25 to 5 ounces of rubber per square yard. The counter penetrant is used to prevent the compound from significantly penetrating the top layer of soil. The compounds of the present invention contain a significantly higher solids level than that in the Arco patent. The compounds do not penetrate the soil but rapidly dry to form a crust on the soil surface.

British Pat. No. 1,007,671, issued Oct. 22, 1965, to The International Synthetic Rubber Company Limited discloses a process for controlling soil erosion. The process comprises applying to a soil a latex of an oil extended rubber. The rubber latex may be extended with from 50 to 1000 parts by weight of oil per 100 parts by weight of rubber. The latex is applied at a rate to provide from about 40 to 300 grams of oil extended rubber per square meter. The latex is applied at a solids content of from about 5 to 30 per cent. The composition of the present invention may be used at a much higher solids content, namely in the 30 to 85 per cent total solids range. The present invention is directed to enhancing crop production whereas British Pat. No. 1,007,671 is primarily concerned with prevention of soil erosion.

British Pat. No. 1,053,870, issued Jan. 4, 1967, to The International Synthetic Rubber Company also deals with methods to prevent soil erosion. The surface of the soil is treated with rubber which has been extended with oil or bitumen or both. The bitumen helps reduce the cost of the treatment. The cost of oil has risen dramatically in the 1970's which tends to make the extending of rubber with oil less economicaly feasible for the application of rubbery emulsions to reduce soil erosion. The cost of bitumen has also increased in the 1970's making the use of latices extended with bitumen less economically feasible for the prevention of soil erosion.

Neither of the International Synthetic Rubber Company patents contemplates the high loading of particulate filler as required in the present invention. As noted above the filler loadings used in the present invention contribute to the formation of a crust on the agricultural domain.

Applicant has discovered that highly filled latex compounds may be applied to an agricultural domain to enhance crop yield. The latex compound need not form a continuous impermeable film. In fact, it may be desirable to apply a latex compound which forms a permeable crust.

SUMMARY OF THE INVENTION

The present invention provides a process for enhancing crop production comprising applying to an agricultural domain an aqueous compound having a solids level of not less than 30 per cent by weight, which is capable of forming a protective crust under the conditions of use comprising per 100 parts by weight of polymeric binder from about 100 to 1600 parts by weight of a fine particulate filler, to provide a dry coat weight of from 0.1 to 5.0 ounce per square foot.

There are a number of theories concerning factors which affect plant growth. Germination tends to require temperatures in excess of 55° F. Photosynthesis takes place at a relatively rapid rate at temperatures in the range from 50 to 95° F., with faster rates at higher temperatures. The transpiration of a plant is affected by the atmospheric temperature at the leaves and the soil temperature. The present invention may be used to increase the soil temperature and the temperature above the soil. These increases in temperature should increase photosynthesis rate which should promote plant growth. The temperature increase should also increase transpiration rates in plants. It is believed that such increases should increase the water uptake of a plant and possibly increase the uptake of nutrients from the soil, in effect "force feeding" the plant.

DESCRIPTION OF PREFERRED EMBODIMENTS

As used on this specification the term agricultural domain is intended to be given a broad interpretation including, trays of flowers or vegetables grown in greenhouses, fields such as in growing cereals including corn and wheat and in vegetable and fruit farms, outdoor nurseries for trees, shrubs and plants, sod farms, and reforestation projects.

The phase "capable of forming a protective crust under the conditions of use" means that when the compound is applied to an agricultural domain it will dry to form a crust which will withstand normal weather conditions expected for the time period the crust will remain in place. These conditions and times may vary widely from a short period of about a month in a green house to a growing season on a farm field, to several years in a forest, vineyard or orchard. The capability of forming a protective crust under the condition of use in most instances may be fairly simply tested. A sample of compound is applied to the soil at the desired dry coat weight and allowed to dry to form a crust. The crust is then sprinkled with an amount of water sufficient to approximate a heavy rain. The crust should not break up under these conditions. After the crust is dry it should crumble when lightly rubbed between the thumbs and forefingers.

Polymeric binders used in accordance with the present invention must be capable of forming a crust with the other ingredients in the compounds and the soil surface. Generally, the compound should be film forming under the conditions of use. Preferably, the polymer should have a glass transition temperature (Tg) of less than about 35° C., most preferably the Tg of the polymer is less than about 20° C. It is possible to compound a polymer having a Tg greater than about 35° C. with plasticizers so that the resulting compound would be capable of forming a protective crust under the conditions of use.

In the practice of the present invention, it is desirable to formulate the compound to have no, or a minimum, detrimental effect on the environment. In considering this desideratum one must take into account the facts that the components in the compound, and the compound per se will be left in the agricultural domain, and that the agricultural domain may be subject to multiple treatments according to the present invention. In selecting ingredients one should consider available information and scientific opinion concerning the effect of each ingredient in the compound and their residues on the environment.

There are a great many types or families of polymers which may be used in accordance with the present invention. The length of time the crust is to remain in place will influence the selection of polymer. Generally rubbery polymers are suitable for use in the present invention. This includes natural rubber, chloroprene, polyisoprene and synthetic rubber.

Usually, synthetic rubber is a polymer consisting primarily of soft monomer such as $C_{4-6}$ conjugated diolefins and a hard monomer such as $C_{8-12}$ vinyl aromatic monomers or a $C_{2-8}$ alkenyl nitrile. Generally, the $C_{4-6}$ conjugated diolefin is present in an amount from about 20 to 80 weight per cent of the polymer, preferably from about 80 to 30, most preferably from about 40 to 80 weight per cent of the polymer. The $C_{8-12}$ vinyl aromatic monomer is generally present in the polymer in an amount from about 80 to 20 weight per cent of the polymer, preferably from about 20 to 70, most preferably from about 20 to 60 weight per cent of the polymer. Suitable $C_{8-12}$ vinyl aromatic monomers may be unsubstituted or substituted by a $C_{1-4}$ alkyl radical or a chlorine or bromine atom.

Suitable $C_{4-6}$ conjugated diolefins include butadiene and isoprene. Suitable $C_{8-12}$ vinyl aromatic monomers include styrene, alpha-methyl styrene, tertiary-butyl styrene, chlorostyrene, bromostyrene.

The synthetic rubber may also contain a monomer having a functional group. The monomer containing a functional group may be present in an amount from about 0.5 to 10 weight per cent of the polymer, preferably from about 0.5 to 5 weight per cent. The monomer having a functional group may be an acid, an ester, an aldehyde or an amide. Suitable acid monomers include $C_{3-9}$ ethylenically unsaturated carboxylic acids. Suitable ester monomers include $C_{1-8}$ alkyl or $C_{1-8}$ alkanol esters of $C_{3-9}$ ethylenically unsaturated carboxylic acids. Suitable aldehyde monomers include $C_{3-9}$ ethylenically unsaturated aldehydes. Suitable amides include amides of $C_{3-9}$ ethylenically unsaturated acids, which may be unsubstitued or substituted at the nitrogen atom by up to two $C_{1-4}$ alkyl or alkanol radicals.

Typical monomers containing functional groups include acrylic acid, methacrylic acid, fumaric acid, itaconic acid, cinnamic, citraconic acid, maleic acid, methyl acrylate, methyl methacrylate, ethyl acrylate, ethyl methacrylate, hydroxyethyl acrylate, hydroxyethyl methacrylate, ethylhexyl acrylate, ethylhexyl methacrylate, acrylamide, N-methyl acrylamide, N-ethyl acrylamide, methacrylamide, N-methyl methacrylamide, N-ethyl methacrylamide, N-methylol acrylamide, N-methylol methacrylamide, acrolein, methacrolein, and cinnamaldehyde.

In the foregoing polymers, up to about 40 weight per cent of the $C_{8-12}$ vinyl aromatic monomer may be replaced by a $C_{3-9}$ alkenyl nitrile. The most common alkenyl nitrile is acrylonitrile.

Nitrile rubber polymers per se may also be used in accordance with the present invention. These polymers comprise from about 5 to about 35 weight per cent of a $C_{2-8}$ alkenyl nitrile, preferably acrylonitrile, and from about 95 to about 65 weight per cent of a $C_{4-6}$ conjugated diolefin. The nitrile rubber may also contain up to about 10 weight per cent of a monomer which contains a functional group. Suitable monomers which contain functional groups have been listed above.

Polymeric binders useful in accordance with the present invention may be polymers of olefins and alkenyl or alkenol esters of $C_{1-8}$ saturated carboxylic acids. Suitable polymers comprise from about 1 to about 40 weight per cent of at least one $C_{2-4}$ mono-olefin and from about 99 to 60 weight per cent of a $C_{2-8}$ alkenyl or alkenol ester of a $C_{1-8}$ saturated carboxylic acid. Suitable mono-olefins include ethylene and propylene. The most common $C_{2-8}$ alkenyl or alkenol eters of a $C_{1-8}$ saturated carboxylic acid is vinyl acetate. Optionally, the polymers may also contain from about 0.5 to 5 weight per cent of a monomer containing a functional group as described above.

The polymeric binder maybe a polymer of an $C_{2-3}$ olefin and an $C_{1-8}$ alkyl or $C_{1-8}$ alkanol ester of a $C_{3-9}$ ethylenically unsaturated $C_{3-9}$ carboxylic acid. The olefin may be present in an amount from about 1 to about 40 weight per cent. The alkyl or alkanol ester of a $C_{3-9}$ ethylenically unsaturated carboxylic acid may be present in an amount from about 99 to about 60 weight per cent. Optionally the polymer may contain from about 0.5 to 10 weight per cent of a monomer having a functional group. Suitable olefins, esters and monomers having a functional group have been discussed above.

The polymer may be a functional olefin. The polymer may comprise from about 10 to about 20 weight per cent of a monomer containing a functional group preferably acrylic or methacrylic acid and the balance a $C_{2-3}$ olefin.

The polymeric binder may be an acrylic type binder. Such polymers may consist of from about 60 to about 99.5 weight per cent of a $C_{1-8}$ alkyl or alkanol ester of acrylic or methacrylic acid and from about 0.5 to 40 weight per cent of a $C_{3-8}$ ethylenically unsaturated carboxylic acid. Suitable ethylenically saturated carboxylic acids have been listed above.

Other polymers which may be used in accordance with the present invention are polyvinyl chloride, ethylene-propylene copolymers, butyl rubber, copolymers of ethylene, propylene and a conjugated diene monomer, polysulfides such as the condensation product of a $C_{2-4}$ olefin dichloride with sodium polydisulfide.

Many of the above polymers may be prepared by free radical emulsion polymeriation processes. Usually the resulting latices are anionic or non ionic. The polymers may in some cases be prepared as cationic emulsions. Polymers which have not been prepared in an aqueous emulsion may be converted to a latex by techniques well known in the art. Organic solutions or dispersion of a polymer may be emulsified in water and the organic phase may then be driven off.

Depending on the type of polymer and the properties sought in the crust, the molecular weight and molecular weight distribution of the polymer may be controlled. Methods for controlling the molecular weight and molecular weight distribution of many emulsion polymers are well known and involve the use of "modifiers" such as carbon tetrachloride or an alkyl mercaptan.

The aqueous polymer dispersion is compounded with from about 100 to about 1600 parts by weight of a particulate filler. As the compound is generally intended to be applied as a spray, the filler should be of a sufficiently small size to pass through a spray nozzle. The filler should not be fibrous, that is, having a length substantially greater than its diameter. Suitable compounding ingredients include the fillers and pigments commonly used in the latex compounding. The filler may be finely divided matter of organic origin such as wood flour, sawdust, cellulose, starch, lignosulfonate, lignin, or very finely divided vegetable matter, or particulate organic waste, or a mixture thereof. The filler may be an inorganic material such as calcium carbonate, clay, stonedust, limestone, carbon black or micaflakes, or a mixture thereof. The micaflakes preferably should have a high aspect ratio. Such mica causes sunlight to be reflected which is believed to give a degree of insect control as well as cooling the soil in hotter climates. Preferably, the filler is used in an amount from about 300 to 800 parts by weight per 100 parts by dry weight of polymer. Depending upon the climate during the growing season the colour of the compound may be selected to provide an increased benefit. Black compounds provide maximum opacity. White compounds provide cooler root temperature. Silver compounds provide maximum cooling. Transparent compounds allow maximum radiation to pass into the soil and may help soil sterilization. In cooler climates the compound preferably contains sufficient carbon black to make the resulting film heat absorbing. Generally the carbon black is not required in amounts in excess of about 5 parts by weight per 100 parts by dry weight of polymer, preferably in the range from about 1 to 3 parts by weight per 100 parts by weight of polymer. This dark coloured layer by increasing the soil temperature helps the seeds to germinate faster and promotes more vigorous early growth. In hot climates where soil baking tends to be a problem the compound should be heat reflective, preferably white. Under these conditions, the preferred filler would be calcium carbonate or slaked lime, possibly in conjunction with a pigment such as titanium dioxide to increase opacity and whiteness. Transparent compound may be prepared by selecting a filler having a refractive index substantially the same as the refractive index of the polymer. The foregoing illustrates general principles and it must be kept in mind that mixtures of different types of fillers and pigments are contemplated by the present invention.

In preparing the compound a surfactant may be required to ensure that the filler is well dispersed and the compound has sufficent mechanical stability for spraying. The amount of surfactant required will depend on the efficiency of the surfactant. The surfactant may be a soap of a long chain fatty acid or oil such as stearic, palmitic or rosin acid/soaps. The surfactant may be synthetic such as the commercially available sulfate, sulfonate and phosphate derivatives of alkyl, or alkyl aryl, hydrocarbons or the condensation products of polyalkylene glycols and alkyl or alkyl aryl hydrocarbons. (Commercially available surfactants are listed in the annual text Detergents and Emulsions by McCutcheon's). The charge on the surfactant should be compatible with the charge on the dispersion of polymeric binder. The compatibility of the surfactant and the polymeric dispersion can be simply tested by mixing a small sample of dispersion with surfactant and seeing if the dispersion is destabilized.

The amount of surfactant required will generally be in the range from about 0.5 to about 10 parts of weight per 100 parts by dry weight of polymer. The amount of surfactant required to stabilize the compound may be readily determined by routine experiments. In preparing the compounds of the present invention, care should be taken to avoid localized destabilization. For carboxylated latices, it is preferable to add the filler dry. For less stable latices, the filler may have to be added as a paste or dispersion.

The compound may optionally contain a dispersing agent. The dispersing agent may be used in amounts up to about 5 parts, preferably not greater than about 1 to 2 parts by weight per 100 parts by weight of polymeric binder. There are many dispersing agents available. One suitable type of dispersing agent comprises polyphosphates. The total amount of surfactant and dispersing agent should be kept to a minimum to minimize the rewetting of the protective crust and consequent loss of strength.

The compound is generally prepared to a solids content of from about 30 to 85 weight per cent, preferably from about 50 to 85 weight per cent. If desired, the compound may be subsequently diluted with water but this will require a higher application rate or multiple passes to achieve the required coat weight. Desirably the compound is used at not less than about 30 weight per cent solids, most preferable not less than 50 weight per cent solids.

The compound may contain additional ingredients used in the agricultural industry. The compound may contain small amounts of viscosity control agents to provide a viscosity of about 1000 cps thus preventing the filler from settling out. Useful thickeners include the natural thickeners such as guar gum, gum tragcanth, gum arabic, carrageenin, starch, pectin, cellulose, modified thickeners such as carboxymethyl cellulose and synthetic thickeners such as sodium polyacrylates.

The compound may also contain other agents to enhance crop production including fertilizers, herbicides, fungicides, insecticides, nematicides and plant nutrients such as trace amounts of mineral salts containing one or more of sodium, manganese zinc, copper, iron, potassium, lithium, magnesium, boron, iodine, cobalt, molybdenum, silicon, fluorine, aluminium, nickel, selenium, and sulphur. Organic compounds, biostimulants and natural growth promoters such as yeast, auxentriolic acid, auxenolonic acid, indole acetic acid, naphtholine acetric acid, and auxin lactose may also be included in the compound. The compound could also contain small amounts of bacteria capable of producing nitrogen in the soil such as Azobacter and Adostridium posteuranium, and B. Radicicola. The amount of such growth enhancing materials in the total compound will be very low and should not cause instability in the compound.

If fertilizers, herbicides, nematicides, fungicides or insecticides are incorporated into the compound they will generally be used in fairly low amounts, usually not more than about 10 parts by weight, preferably in the range from about 1 to 4 parts by weight per 100 parts by weight of polymeric binder. Water soluble herbicides, insecticides, nematicides, fungicides, fertilizers or other growth stimulants are readily incorporated into the compound. Care should be taken to avoid destabilization of the compound which could lead to spraying problems. Hydrophobic fertilizers, herbicides, insecticides, nematicides, fungicides or plant growth stimulating agent may be prepared as oil in water emulsions, which may be added to the compounds of the present invention.

As noted above, the present invention provides greater flexibility in incorporating fertilizers, herbicides, insecticides, nematicides, fungicides and growth stimulating agents as they are not subjected to the extrusion temperatures required in the manufacture of plastic sheet mulch.

The compound may be applied to a prepared field or unprepared terrain when employed in reforestation applications. Depending on the crop, the preparation may be as simple as harrowing the field. In high value vegetable and small fruit farming, the preparation tends to be more intensive. The field may be formed into raised beds in rows and a fumigant may be applied to the soil. The compound may be applied following fumigation. Preferably the soil is very lightly rolled to smooth and slightly compact the soil surface prior to applying the compound. If desired the crop may be seeded or transplants set in place prior to application of the compound. If required, guards may be placed on the spray applicator to prevent the latex from being applied where the seeds are sown. It is also possible to seed or transplant the crop subsequent to application of the compound. In this case the seed could be pregerminated if desired. The equipment to apply the compound will depend on the size of the area under cultivation. For the backyard gardener, greenhouse use, or for reforestation, a simple hand held sprayer will suffice. Liquid mulch according to the present invention may be sold to apartment or indoor gardeners in aerosol or pump spray containers. For the commercial vegetable farmer conventionally available spray equipment with multispray capabilities and interchangeable tip capabilities is preferred. To minimize labour various pieces of farm equipment may be used in tandem. Thus a fumigent applicator, bed shaper, roller, planter, and sprayer could be used in tandem to provide a one pass planting, with a reduction in planting costs.

The compound is applied to provide a dry coat weight of from 0.1 to 5.0 ounce per square foot. Preferably the coat weight is from about 0.25 to about 1.0 ounce per square foot. The compound should dry to form a crust on the surface of the soil. At the low coat weight it may be desirable to apply the compound in a foamed state to control the application rate of compound. The use of foamed compound in textile applications is well known and disclosed in Canadian Pat. Nos. 794,319 and 876,069 issued Sept. 10, 1968 and July 20, 1971 respectively to Polymer Corporation.

In cases where it is desired to form a more impermeable film of compound it is possible to apply two or more coats.

As noted above commercially available spray equipment may be used to apply the compound in accordance with the present invention. For some applications such as transplant trays for vegetables or bedding plants or even corn fields it may be preferable to spray the entire agricultural domain. In other applications such as reforestation projects the spray may be applied in an area from about 6" to about 60", preferably about 18" to about 24" around the base of the transplanted tree. In truck farming the compound may be applied in strips down the field or the raised beds depending on the type of crop and the requirements of the equipment these strips may be anywhere from about 6" up to 60" or the width of the spray equipment. By closing nozzles or in more sophisticated equipment moving guards the area of spray application may be divided into strips or bands. Generally for tomatoes and similar vegetables the strips should extend from about 6 to about 60 inches preferablly from about 12 to 18 inches on each side of a row of plants.

The following example is intended to illustrate the invention and is not indended to limit the scope of the present patent application. A field in Port Lambton, Ontario, was prepared by ploughing and harrowing. A series of strips 20 feet long were treated as follows:
(a) No treatment (control)
(b) Covered with a plastic sheet mulch; and
(c) Sprayed with compound at an application rate of
  (i) 0.7 ounce/square foot—24" wide The compound was formulated as follows, on a dry weight basis

| | |
|---|---|
| Latex A (a carboxylated SBR latex) | 100 parts |
| Surfactant | 0.5 |
| Dispersant | 1.25 |
| Calcium carbonate | 300 |
| Water to 50 percent solids. | |
| Carbon black to provide a black or dark grey colour | 1-2 parts |
| Viscosity control agent - to provide a viscosity of 1000 cps. to prevent filler settling out of the compound. | |

The compound was stable and did not suffer filler settling out and was applied using a hand sprayer. After the compound dried, transplanted tomato plants were planted in the control, plastic sheet mulch and domains treated in accordance with the present invention.

The domains were sprayed on June 1, 1984 by July 20 the growth on the areas treated in accordance with the present invention was superior to the control areas and comparable to the domains treated with plastic sheet mulch. The domains treated in accordance with the present invention had a darker surface than areas treated with plastic mulch. The composition applied in accordance with the present invention did not form a continuous film. Rather, the surface crust may break open in a manner similar to mud cracking in a dried puddle or pond. After harvesting the yield from the various experimental plots with a liquid mulch applied at 0.7 oz./sq. foot dry weight was as follows:

| | PLASTIC MULCH | SPRAYED MULCH | BARE SOIL |
|---|---|---|---|
| Width of treated area | 36" | 24" | — |
| Type of Plastic | Pre slit | — | — |
| Plant spacing | 12" | 12" | 12" |
| No. of plants | 40 | 40 | 40 |
| No. alive 9 days after planting | 35 | 36 | 20 |
| Soil temp. 9 days after planting(°F.) | 95° | 100° | 70° |
| Fruit yield from 3 random plants* 80 days from planting (lb) | 12.3 | 13.5 | 7.5 |
| Total ripe fruit 80 days from planting (lb) | 128 | 124 | 64 |
| Days to first ripe pick | 72 | 75 | 80 |

*Note
Normally harvesting of this crop takes place about 90 days after planting. The yield from 3 random plants was a mixture of both green and ripe fruits.

The plastic mulch and the spray mulch produced approximately the same amount of ripe fruit at about 80 days after planting. It is important to note that the rows treated with plastic mulch required a bed width of 36". After harvest the areas treated in accordance with the present invention required no further treatment to remove the compound. The crust was completely friable and normal cultivation returned the soil to substantially the condition prior to application of the compound. To the farmer this is a significant saving over the cost required for removing plastic mulch from the field which may range from about $100 to $150 per acre.

In a laboratory experiment 10"×10" trays were filled to a depth of from 1½" to 1¼" with soil. Then each tray was planted with pregerminated tomato seeds. The trays were then sprayed with two different compounds at various coat weights. The compound formula was as in example 1. In one case Latex A described above was used, in the other case another carboxylated SBR latex having a higher styrene content was used, (Latex B). The coating was applied at various weights. The trays were then placed in the open air on top of the research laboratories of Polysar Limited.

During this test program one of the most impressive things observed was the relatively luxuriant nature of growth rate for the seedlings in those two trays where spray mulch had been employed compared to the control. The differences were most impressive to see but difficult to describe. To aid in conveying these differences a "growth index" value is employed. It is derived by multiplying the approximate average height of the seedling in a given tray by the average diameter of the foliage umbrella, in centimeters. The values given appear to reasonably convey the relative differences in growth vigor. The obvious explanation(s) for the increased vigor was improved heat and moisture retention.

On day 6, the temperature of the soil in the trays was measured. The air temperature at the time of measuring soil temperature was 89.2° F. The experiment had to be terminated due to an extremely severe wind and rain storm which removed some surface soil and exposed the roots of the plants in the control tray. No evidence of such soil loss observed in any of the trays treated in accordance with the present invention.

The results are recorded in the following table entitled "Emergence Studies".

| EMERGENCE STUDIES-EFFECT OF COATING WEIGHT | | | | | | | | | | |
|---|---|---|---|---|---|---|---|---|---|---|
| TRAY # | 1 | 2 | 3 | 4 | 5 | 6 | 7 | 8 | 9 | 10 |
| COMPOUND | CONTROL | LATEX A | | | | | LATEX B | | | |
| COATING-OZ./FT² | NIL | 0.125 | 0.25 | 0.5 | 0.75 | 1.0 | 0.125 | 0.25 | 0.5 | 0.75 |
| % EMERGENCE @ DAY 1 | 0 | 0 | 0 | 0 | 0 | 0 | 0 | 0 | 0 | 0 |
| 2 | 0 | 0 | 0 | 0 | 0 | 0 | 0 | 0 | 0 | |
| 3 | 6 | 3 | 6 | 11 | 3 | 6 | 3 | 6 | 3 | 3 |
| 6 | 8 | 11 | 42 | 53 | 25 | 28 | 31 | 42 | 25 | 22 |
| 7 | 25 | 14 | 50 | 58 | 39 | 33 | 39 | 47 | 28 | 33 |

-continued

| TRAY # | | 1 | 2 | 3 | 4 | 5 | 6 | 7 | 8 | 9 | 10 |
|---|---|---|---|---|---|---|---|---|---|---|---|
| COMPOUND | | CONTROL | LATEX A | | | | | LATEX B | | | |
| COATING-OZ./FT$^2$ | | NIL | 0.125 | 0.25 | 0.5 | 0.75 | 1.0 | 0.125 | 0.25 | 0.5 | 0.75 |
| 8 | 25 | 17 | 56 | 58 | 42 | 33 | 39 | 50 | 31 | 33 | |
| 9 | 25 | 20 | 56 | 67 | 44 | 33 | 39 | 50 | 42 | 36 | |
| 10 | 25 | 22 | 61 | 67 | 44 | 36 | 39 | 53 | 42 | 39 | |
| 14 | 36 | 28 | 67 | 67 | 50 | 36 | 39 | 56 | 50 | 42 | |
| 21 | 36 | 28 | 67 | 67 | 50 | 39 | 39 | 56 | 50 | 42 | |
| GROWTH INDEX @ DAY 21 | | 7 | 42 | 24 | 56 | 13 | 30 | 28 | 14 | 10 | 25 |
| TEMPERATURE PROFILE °F. | | 96.1 | 95.7 | 96.6 | 96.6 | 98.1 | 99.1 | 97.5 | 97.0 | 96.8 | 97.9 |

NOTE:
Temperature Profile is soil temperature 1" below the soil surface at 1 P.M., July 30, air temperature 89.2° F.

On Aug. 21, 1984, a sample of the compound prepared with Latex A was tested in La Salle, Mich., for field sprayability. The compound was evenly sprayed using a single spray tip in a two foot wide path at a tractor speed of 0.5 mph. The dry coat weight was about 0.69 oz. per square foot. The tractor speed was that normally used to transplant tomatoes. The crust dried quickly and measurements were taken of the air temperature above the crust surface and in the soil at a 6" depth. The results are as follows:

| | Soil | Covered With Liquid Mulch |
|---|---|---|
| Air Temp. (°F.) | 90 | 100 |
| Soil Temp. at 6" (°F.) | 78 | 81 |

For the purposes of comparison, a series of experiments were conducted to compare the growth of pregerminated tomato seeds treated in accordance with the present invention and treated in accordance with British Pat. No. 1,007,671 and U.S. Pat. No. 2,961,799.

A series of 10"×10"×2.25" trays were filled with soil to a depth of about 2" with commercial top soil. In each tray, 25 pregerminated tomato seeds were planted at a depth of 0.37". The trays were then treated in the following manner.

One tray was untreated. This serves as a control.

Two trays were treated in accordance with the present invention. The compound was a retained sample from the compound applied to the soil in a commercial manner using a single tip sprayer. The compound was applied at a 50 per cent solids level to provide dry coat weights of 0.75 and 0.5 oz./foot$^2$. In a further comparative example, the solids level was diluted to 25 per cent.

A series of trays were treated in accordance with Example 10 of British Pat. No. 1,007,671. Example 10 was selected as it was felt to be closest to the subject matter of the present invention in terms of solids content and pigment levels.

In all the examples in this series of experiments, the latex used was a carboxylated SBR latex commercially produced by Polysar Limited. The latex was extended with Sundex 890 TM oil. The oil was added to the latex as an oil in water emulsion prepared in accordance with the teaching from line 63 through line 75 at page 3 of the disclosure. Ionic stabilizer was not added to the oil in water emulsion.

The compound formula in parts by dry weight was as follows:

| | Emulsion Solids | Dry Parts | |
|---|---|---|---|
| Latex | — | 100 | |
| Sundex 890 emulsion | (50%) | 300 | |
| Carbon black | (35%) | 4 | |
| Water | — | — | to 30% solids |

The compound was applied at a dry coat weight of 0.50 oz./foot$^2$ in accordance with the present invention, and at 0.1667 oz./foot$^2$ (This later application was based on the rate of ¼ imperial pint per square yard specified in the example.) The dry coat weight corresponds to wet coat weights of 11.00 grams per tray and 33 grams per tray respectively.

A compound was prepared in accordance with the formulation given at lines 50 to 56 of Col. 11 of U.S. Pat. No. 2,961,799. The compound was applied to three trays. The coat weights were 0.25 and 5.0 oz. of rubber per square yard, based on the minimum and maximum coat weights disclosed at line 8 of Col. 7. This gave dry application rates of 0.0278 and 0.5556 oz./foot$^2$. The remaining tray was treated to provide a dry coat weight of 0.5 oz./foot$^2$.

When the trays were initially prepared, the coatings in accordance with the present invention dryed rapidly to form a crust. The coatings in accordance with the prior art had a much higher water content and the trays were extremely wet. The coating compositions had a greater tendancy to penetrate the soil.

The trays were placed on the roof of the Polysar Research Building at Sarnia, Ontario. The trays were placed out on Aug. 30, 1984, and the following observations were made.

Colour indicates the darkness of the surface of the tray when the samples were put outside. The colour was judged on a scale of 1 to 10 with 10 being the darkest.

The Growth Index was calculated as described above.

When the plants were placed outdoors, it was towards the end of the growing season. The weather was cooler than normal and there were several severe thunderstorms. Generally, the emergence of the plants was low and the Growth Index was low.

| | COMPARATIVE EXAMPLES | | | | | | | |
|---|---|---|---|---|---|---|---|---|
| TRAY # | 1 | 2 | 3 | | 4 | 5 | 6 | 7 | 8 |
| COMPOUND | CONTROL | INVENTION | | 3A | UK 1,007,671 | | US 2,961,799 | | |
| COATING-OZ./FT$^2$ | NIL | 0.75 | 0.5 | 0.5 | 0.167 | 0.5 | .0278 | .5556 | 0.5 |
| COLOUR | 1 | 7 | 6 | 4 | 5 | 5 | 2 | 3 | 3 |
| % EMERGENCE @ DAY 1 | 0 | 0 | 0 | 0 | 0 | 0 | 0 | 0 | |

-continued

| TRAY # | COMPARATIVE EXAMPLES | | | | | | | | |
|---|---|---|---|---|---|---|---|---|---|
| | 1 CONTROL | 2 INVENTION | 3 | 3A | 4 UK 1,007,671 | 5 | 6 US 2,961,799 | 7 | 8 |
| COMPOUND | | | | | | | | | |
| COATING-OZ./FT² | NIL | 0.75 | 0.5 | 0.5 | 0.167 | 0.5 | .0278 | .5556 | 0.5 |
| COLOUR | 1 | 7 | 6 | 4 | 5 | 5 | 2 | 3 | 3 |
| 6 | 8 | 4 | 12 | 0 | 8 | 0 | 0 | 0 | 0 |
| 7 | 8 | 16 | 24 | 0 | 16 | 4 | 4 | 0 | 4 |
| 8 | 12 | 32 | 38 | 0 | 20 | 0 | 4 | 4 | 8 |
| 9 | 24 | 36 | 60 | 4 | 40 | 8 | 20 | 8 | 8 |
| 12 | 36 | 40 | 68 | 28 | 72 | 32 | 40 | 12 | 36 |
| 13 | 36 | 40 | 72 | 28 | 72 | 32 | 44 | 16 | 36 |
| 15 | 36 | 40 | 72 | 28 | 72 | 32 | 44 | 16 | 36 |
| 16 | 36 | 40 | 72 | 28 | 72 | 32 | 44 | 16 | 36 |
| 19 | 36 | 40 | 72 | 28 | 72 | 32 | 44 | 16 | 36 |
| GROWTH INDEX @ DAY 21 | 4.1 | 6.3 | 6.1 | 3.0 | 2.5 | <2.0 | 4.6 | 2.3 | 3.8 |

NOTE:
DAY 1 - AUGUST 30, 1984.
TRAY 3A - COMPOUND SPRAYED AT 25.0 PERCENT SOLIDS.

On day 6, the soil temperature at the bottom of the trays was measured. The results are:

| Tray No. | 1 | 2 | 3 | 3A | 4 | 5 | 6 | 7 | 8 |
|---|---|---|---|---|---|---|---|---|---|
| Temp. (°F.) | 70 | 76 | 75 | 76 | 74 | 73 | 72 | 72 | 72 |

What is claimed is:

1. A liquid agricultural mulch having a solids content from 50 to 85 percent by weight of:
(A) per 100 parts by dry weight of a latex of a polymer having a Tg of less than 20° C. said polymer selected from the group consisting of:
  (a) polymers of: from 20 to 80 weight percent of a $C_{4-6}$ conjugated diolefin, from 80 to 20 weight percent of a mixture comprising:
    from about 100 to 60 weight percent of $C_{8-13}$ vinyl aromatic monomer which may be unsubstituted or substitued by a $C_{1-4}$ alkyl radical or a chlorine or bromine atom; and up to 40 weight percent of a $C_{3-9}$ alkenyl nitrile;
    and optionally from about 0.5 to 10 weight percent of one or more monomers selected from the group consisting of:
      (i) $C_{3-9}$ ethylenically unsaturated carboxylic acid or $C_{1-8}$ alkly or $C_{1-8}$ alkanol esters thereof;
      (ii) $C_{3-9}$ ethylenically unsaturated aldehydes
      (iii) amides of $C_{3-9}$ ethylenically unsaturated acids which may be unsubstituted or substituted at the nitrogen atom by up to two $C_{1-4}$ alkyl or $C_{1-4}$ alkanol radicals;
  (b) polymers of: from about 1 to 40 weight percent of at least one $C_{2-4}$ mono olefin;
    from about 99 to 60 weight percent of an alkenyl or alkenol ester of a $C_{1-8}$ saturated carboxylic acid;
    and optionally from about 0.5 to 10 weight percent of one or more monomers selected from the group consisting of:
      (i) $C_{3-9}$ ethylenically unsaturated carboxylic acid or $C_{1-8}$ alkyl or $C_{1-8}$ alkanol esters thereof:
      (ii) $C_{3-9}$ ethylenically unsaturated aldehydes
      (iii) amides of $C_{3-9}$ ethylenically unsaturated acids which may be unsubstituted or substituted at the nitrogen atom by up to two $C_{1-4}$ alkyl or $C_{1-4}$ alkanol radicals:
  (c) polymers of: from about 5 to 35 weight percent of a $C_{2-8}$ alkenyl nitrile;
    from about 95 to 65 weight percent of a $C_{4-6}$ conjugated diolefin;
    and optionally from about 0.5 to 10 weight percent of one or more monomers selected from the group consisting of:
      (i) $C_{3-9}$ ethylenically unsaturated carboxylic acid or $C_{1-8}$ alkyl or $C_{1-8}$ alkanol esters thereof:
      (ii) $C_{3-9}$ ethylenically unsaturated aldehydes
      (iii) amides of $C_{3-9}$ ethylenically unsaturated acids which may be unsubstituted or substituted at the nitrogen atom by up to two $C_{1-4}$ alkyl or $C_{1-4}$ alkanol radicals.
(B) from about 300 to about 800 parts by weight of one or more fine particulate fillers selected from group consisting of calcium carbonate, clay, stone dust, limestone, carbon black, micaflakes, and slated lime;
(C) from about 0.5 to 10 parts by weight percent of a surfactant;
(D) optionally up to about 5 parts by weight of a dispersing agent;
(E) optionally up to about 10 parts by weight of one or more members selected from the group consisting of fertilizers, herbicides, fungicides, insectides, nematicides, trace minerals, and organic biostimulants; and
(F) sufficient thickening agent to provide a viscosity of about 1000 cps.

2. A liquid agricultural mulch according to claim 1 wherein said polymer comprises of about 20 to 35 weight percent of at least one member selected from the group styrene and a methyl styrene;
from about 79.5 to 55 weight percent of at least one member selected from the group butadiene and isoprene; and
from about 0.5 to 10 weight percent of at least one member selected from the group acrylic acid, methacrylic acid, fumaric acid, itaconic acid, cinnamic acid, methyl acrylate, methyl methacrylate, ethyl acrylate, ethyl methacrylate, hydroxyethyl acrylate, hydroxyethyl methacrylate, ethylhexyl acrylate, ethylexyl methacrylate, acrylamide, N-methyl acrylamide, N-ethyl acrylamide, methylacrylamide, N-methyl methacrylamide, N-ethyl methacrylamide, acrolein, methacrolein and cinnamaldehyde.

3. A liquid agricultural mulch according to claim 1 wherein said polymer comprises a latex of a polymer of from about 1 to about 40 weight percent of at least one $C_{2-4}$ mono olefin; and from about 99 to about 60 weight percent of $C_{2-8}$ alkenyl ester of a $C_{1-8}$ of a saturated carboxylic acid.

4. A liquid agricultural mulch according to claim 3 wherein said polymer comprises from about 10 to about 25 weight percent to ethylene and from about 90 to about 75 weight percent vinyl acetate.

* * * * *